(12) United States Patent
Gorog

(10) Patent No.: US 11,928,222 B2
(45) Date of Patent: Mar. 12, 2024

(54) DISTRIBUTED LEDGER NETWORK IMPLEMENTING A SYNCHRONOUS TRUST CONSENSUS MODEL

(71) Applicant: BlockFrame, Inc., Colorado Springs, CO (US)

(72) Inventor: Christopher Paul Gorog, Pueblo, CO (US)

(73) Assignee: BLOCKFRAME, INC., Colorado Springs, CO (US)

( * ) Notice: Subject to any disclaimer, the term of this patent is extended or adjusted under 35 U.S.C. 154(b) by 148 days.

(21) Appl. No.: 17/488,562

(22) Filed: Sep. 29, 2021

(65) Prior Publication Data

US 2022/0108315 A1   Apr. 7, 2022

Related U.S. Application Data

(60) Provisional application No. 63/123,067, filed on Dec. 9, 2020, provisional application No. 63/086,926, filed
(Continued)

(51) Int. Cl.
*G06Q 10/087* (2023.01)
*G06F 16/23* (2019.01)
(Continued)

(52) U.S. Cl.
CPC ........ *G06F 21/602* (2013.01); *G06F 16/2379* (2019.01); *G06F 21/604* (2013.01);
(Continued)

(58) Field of Classification Search
CPC .............. G06F 21/602; G06F 16/2379; G06F 21/6209; G06Q 10/0835; G06Q 10/087;
(Continued)

(56) References Cited

U.S. PATENT DOCUMENTS 10,783,590 B1 * 9/2020 Zhou .................... H04L 9/50
11,138,602 B2 * 10/2021 Lu ......................... G06Q 40/04
(Continued)

FOREIGN PATENT DOCUMENTS

CA      3061603 A1 * 5/2020 .......... H04L 9/0643
CN    110245956 A  * 9/2019 ......... G06Q 20/3825
(Continued)

OTHER PUBLICATIONS

Title: Graph Learning BFT: A Design of Consensus System for Distributed Ledgers Authors: Myoungwon Oh et al. Date: Sep. 2, 2020 (Year: 2020).*
(Continued)

*Primary Examiner* — Christopher Bridges
*Assistant Examiner* — Yongsik Park
(74) *Attorney, Agent, or Firm* — Lowenstein Sandler LLP

(57) ABSTRACT

A system includes a synchronization group of a distributed ledger network. The synchronization group includes nodes. The nodes include a first node to generate a content block of a ledger, and participate in a consensus process to generate a consensus block based at least in part on the content block. The nodes further include a second node to receive a copy of the content block from the first node, and participate in the consensus process to generate the consensus block.

15 Claims, 6 Drawing Sheets

Related U.S. Application Data on Oct. 2, 2020, provisional application No. 63/086,928, filed on Oct. 2, 2020, provisional application No. 63/086,925, filed on Oct. 2, 2020, provisional application No. 63/086,904, filed on Oct. 2, 2020.

(51) Int. Cl.

| | | |
|---|---|---|
| *G06F 21/60* | (2013.01) | |
| *G06F 21/62* | (2013.01) | |
| *G06Q 10/0835* | (2023.01) | |
| *G06Q 20/38* | (2012.01) | |
| *G06Q 20/40* | (2012.01) | |
| *H04L 9/08* | (2006.01) | |
| *H04L 9/40* | (2022.01) | |

(52) U.S. Cl.
CPC ..... *G06F 21/6209* (2013.01); *G06Q 10/0835* (2013.01); *G06Q 10/087* (2013.01); *G06Q 20/389* (2013.01); *G06Q 20/401* (2013.01); *H04L 9/0827* (2013.01); *H04L 9/085* (2013.01); *H04L 9/0861* (2013.01); *H04L 9/0877* (2013.01); *H04L 63/0442* (2013.01); *H04L 63/0823* (2013.01); *H04L 63/0838* (2013.01)

(58) Field of Classification Search
CPC .... G06Q 20/389; G06Q 20/401; H04L 9/085; H04L 9/0861; H04L 9/30; H04L 9/0877; H04L 63/0442; H04L 63/0823; H04L 63/0838
USPC .......................................................... 705/44
See application file for complete search history.

(56) References Cited

U.S. PATENT DOCUMENTS

| | | | | |
|---|---|---|---|---|
| 11,232,221 | B2* | 1/2022 | Novotny | ............... H04L 67/104 |
| 11,310,311 | B2* | 4/2022 | Shrinivasan | .......... H04L 69/329 |
| 2010/0125670 | A1 | 5/2010 | Dondeti | |
| 2013/0151317 | A1 | 6/2013 | Charfi et al. | |
| 2016/0366111 | A1 | 12/2016 | Smith et al. | |
| 2018/0041484 | A1 | 2/2018 | Gifford et al. | |
| 2018/0130158 | A1 | 5/2018 | Atkinson | |
| 2018/0254898 | A1 | 9/2018 | Sprague | |
| 2018/0316492 | A1 | 11/2018 | Ramachandran | |
| 2019/0132410 | A1 | 5/2019 | Kuzkin et al. | |
| 2019/0164137 | A1 | 5/2019 | Vincent | |
| 2019/0349426 | A1* | 11/2019 | Smith | ................... H04L 67/562 |
| 2019/0354968 | A1* | 11/2019 | Sato | ................... G06Q 20/3825 |
| 2019/0370250 | A1* | 12/2019 | Tipton | ................... H04L 9/321 |
| 2020/0067907 | A1 | 2/2020 | Avetisov | |
| 2020/0074415 | A1 | 3/2020 | Jayaram | |
| 2020/0097927 | A1 | 3/2020 | Groarke | |
| 2020/0119904 | A1* | 4/2020 | Philyaw | ................ H04L 63/105 |
| 2020/0120079 | A1 | 4/2020 | Callaghan | |
| 2020/0142979 | A1* | 5/2020 | Nakamura | .............. G06F 16/27 |
| 2020/0242249 | A1 | 7/2020 | Kumar | |
| 2020/0320207 | A1* | 10/2020 | Beno | ....................... G06F 21/64 |
| 2020/0403805 | A1* | 12/2020 | Steele | ................... H04L 9/3242 |
| 2021/0081557 | A1* | 3/2021 | Thomson-Wood | .......................... G06F 21/6218 |
| 2021/0382831 | A1 | 12/2021 | Sun | |

FOREIGN PATENT DOCUMENTS

| | | | | |
|---|---|---|---|---|
| WO | WO-2019081919 A1 * | 5/2019 | | |
| WO | 2019175878 A1 | 9/2019 | | |
| WO | 2020001996 A1 | 1/2020 | | |
| WO | WO-2022016280 A1 * | 1/2022 | ......... G06F 21/6254 | |

OTHER PUBLICATIONS

PCT Notification of Transmittal of the International Search Report and the Written Opinion of the International Searching Authority for PCT Application No. PCT/US21/52854, dated Dec. 29, 2021.
PCT Notification of Transmittal of the International Search Report and the Written Opinion of the International Searching Authority for PCT Application No. PCT/US21/52865, dated Dec. 28, 2021.
PCT Notification of Transmittal of the International Search Report and the Written Opinion of the International Searching Authority for PCT Application No. PCT/US21/52839, dated Jan. 11, 2022.
PCT Notification of Transmittal of the International Search Report and the Written Opinion of the International Searching Authority for PCT Application No. PCT/US21/52872, dated Jan. 12, 2022.
PCT Notification Concerning Transmittal of International Preliminary Report on Patentability for PCT Application No. PCT/US2021/052854, dated Apr. 13, 2023, 6 pages.
PCT Notification Concerning Transmittal of International Preliminary Report on Patentability for PCT Application No. PCT/US2021/052865, dated Apr. 13, 2023, 11 pages.
PCT Notification Concerning Transmittal of International Preliminary Report on Patentability for PCT Application No. PCT/US2021/052839, dated Apr. 13, 2023, 10 pages.
PCT Notification Concerning Transmittal of International Preliminary Report on Patentability for PCT Application No. PCT/US2021/052872, dated Apr. 13, 2023, 9 pages.
USPTO, Office Action for U.S. Appl. No. 17/488,655, dated Jun. 22, 2023.

* cited by examiner

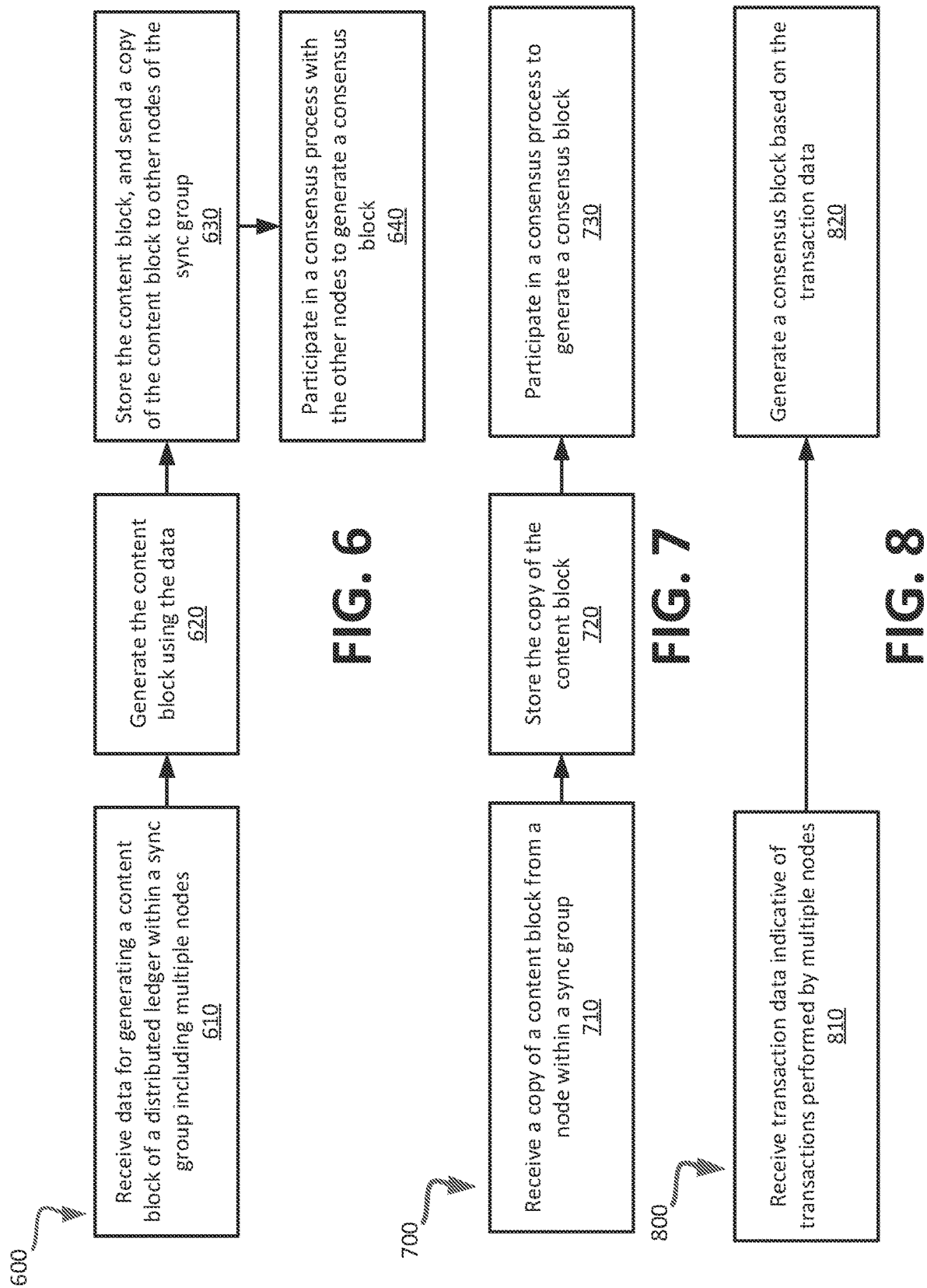

DISTRIBUTED LEDGER NETWORK IMPLEMENTING A SYNCHRONOUS TRUST CONSENSUS MODEL

RELATED APPLICATIONS

The present Application claims priority to Provisional U.S. Patent Application No. 63/086,904, filed on Oct. 2, 2020 and entitled "BLOCKCHAIN SYNCHRONOUS TRUST CONSENSUS MODEL," Provisional U.S. Patent Application No. 63/086,925, filed on Oct. 2, 2020 and entitled "SECURITY MANAGEMENT FRAMEWORK FOR SUPPLY CHAIN FOR ENERGY DELIVERY SYSTEMS," Provisional U.S. Patent Application No. 63/086,926, filed on Oct. 2, 2020 and entitled "ADVANCED SECURITY MODEL BASED ON HYBRID BLOCKCHAIN AND CRYPTOGRAPHIC TRUST CHAIN ARCHITECTURE," Provisional U.S. Patent Application No. 63/086,928, filed on Oct. 2, 2020 and entitled "OPERATIONS AND USAGE OF CTC AND EMBEDDED LIBRARIES FOR ENABLING ADVANCED SECURITY MODEL," and Provisional U.S. Patent Application No. 63/123,067, filed on Dec. 9, 2020 and entitled "CYBER SECURITY ECOSYSTEM FOR SUPPLY CHAIN ORGANIZATION," which are incorporated herein by reference in their entirety for all purposes.

TECHNICAL FIELD

Embodiments of the disclosure relate generally to cybersecurity, and more specifically, relate to a distributed ledger network implementing a synchronous trust consensus model.

BACKGROUND

A distributed public ledger, or more simply a distributed ledger, can track and manage transactions. For example, a transaction can include information indicative of ownership, identity, status and authority. Distributed ledgers are decentralized, meaning that all transactions are public and anyone can recreate the distributed ledger. Within a distributed ledger network, distributed ledger systems, or nodes, can be used to validate a transaction before it is accepted on the distributed ledger. The process of validating a transaction can be referred to as consensus. Accordingly, transactions are validated upon reaching consensus.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is a flow diagram of a method for participating in synchronous trust consensus, in accordance with some embodiments of the present disclosure.

FIG. 7 is a flow diagram of a method for participating in synchronous trust consensus, in accordance with some embodiments of the present disclosure.

FIG. 8 is a flow diagram of a method for supporting synchronous trust consensus, in accordance with some embodiments of the present disclosure.

DETAILED DESCRIPTION

Figure 1:
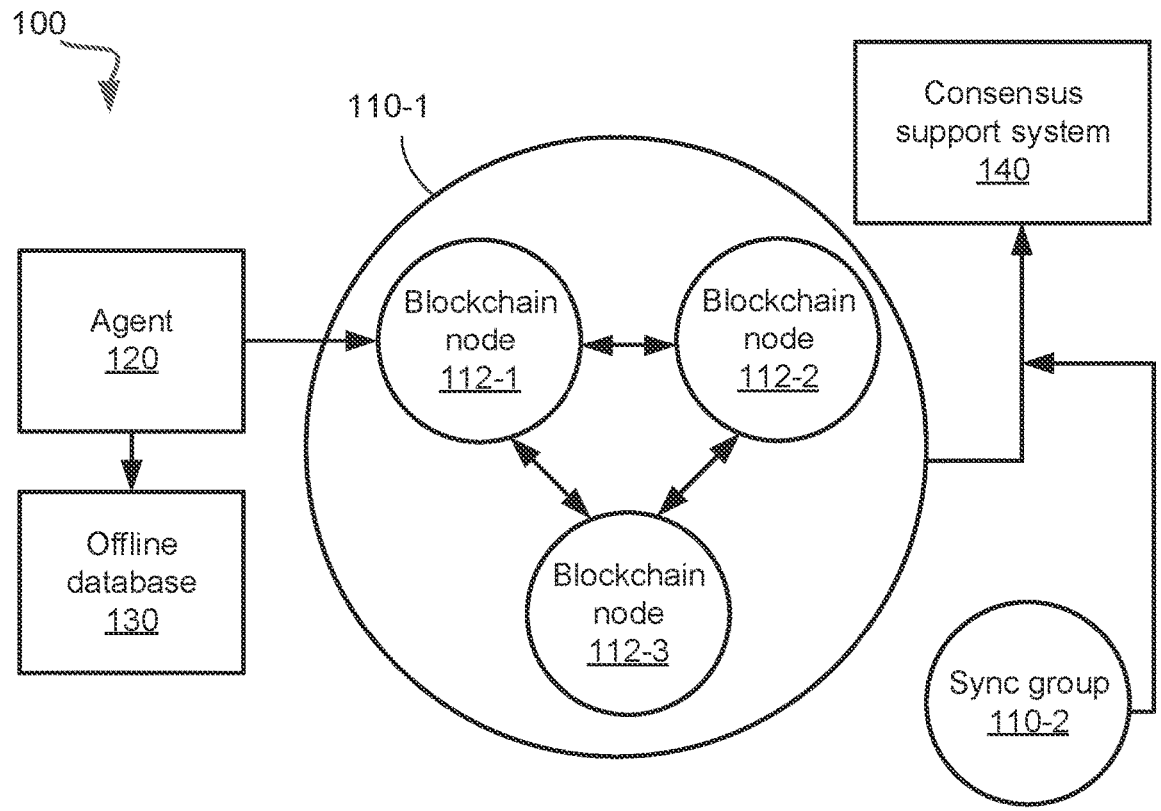
FIG. 1 is a diagram of an example distributed ledger network implementing a synchronous trust consensus model, in accordance with some embodiments of the present disclosure.

Aspects of the present disclosure are directed to distributed ledger networks implementing synchronous trust consensus models. A distributed ledger can be embodied as a chain of linked blocks of data. Each block can contain information associated with a particular electronic (e.g. online) transaction ("transaction"). A transaction generally reflects an update to data maintained on the corresponding distributed ledger network. One example of a transaction is a transfer or exchange of an item from one entity to another entity (e.g., currency, ownership). Another example of a transaction is a sharing of data (e.g., sharing of medical data, object tracking, vote tracking). To complete the transaction, the transaction is recorded within a block on the distributed ledger. The block can include transaction data (e.g., transaction number, relevant information associated with the transaction).

A block of a ledger can include a digest (e.g., a cryptographic hash), as well as a digest of a previous block on the ledger. Thus, any attempted change to an earlier block will fail an integrity check and can be easily identified. Moreover, due to decentralization, any attempt to change an earlier block may be visible. Therefore, digests provide a secure way to create a ledger and enable block validation.

The digest can be generated using a suitable digest generation method based on the input block data. More specifically, the digest generation method employs a one-way function that produces the same output data for a given input. A one-way function is a function that, from a computational complexity perspective, is "easy" to obtain an output for a given input, but "hard" to invert the output to identify the given input. This provides security against potential attackers from tampering with the distributed ledger. For example, the digest can be a hash value, which is an output string of data generated by employing a hashing method to an input string of data. Although the input string can be arbitrarily large, the output hash value can be set to a fixed size in accordance with the hashing method used.

The blocks can be written on a local ledger of a node, but also into some additional ledgers, thereby forming a distributed ledger since the multiple ledgers will have the same information. To confirm transactions made with respect to a distributed ledger, a majority of the nodes must agree upon what is the "correct" block to be written by performing consensus. Various consensus schemes to incentivize nodes to participate in consensus can be employed. For example, certain consensus schemes can employ proof-of-work methods or proof-of-stake based.

Proof-of-work methods can incentivize participation in consensus by providing a reward for successfully performing consensus tasks. One example of a proof of work method is referred to as "mining" (e.g., in Bitcoin). Generally, mining involves attempting to discover a nonce (number used once) value to add to a block corresponding to a transaction to be added to the ledger. The nonce affects the digest (e.g., hash value) calculated for the block. Nodes performing the consensus process, referred to as "miners," can agree upon some pattern that should appear in the digest of the block plus nonce data, and can iterate through a series of random numbers for the nonce until the pattern appears in the digest (e.g., the digest begins with a sequence of six zeroes). Once a nonce value is discovered that can generate the pattern, the nonce value is provided to the other miners to confirm the validity of the nonce value. Once a threshold number of nodes agrees that the nonce value is valid (e.g., a majority of nodes), then consensus is reached and the data can be written to the distributed ledger. The miner who discovered the nonce value can be provided with a monetary reward (e.g., digital currency).

Proof-of-stake methods have been developed to address at least various drawbacks of proof-of-work methods (e.g., large energy and resource consumption, 51% attack of the network). Proof-of-stake methods can incentivize participation in consensus by employing a stake approach. Here, users can stake credits for the right to validate transactions (e.g., by depositing digital currency into a central wallet), and transaction validation (e.g., mining) power for a user is a function of the amount of credits that have been staked. A user's percentage of the total amount of credits staked can correspond to a percentage of blocks that the user can validate. For example, if a user owns 10% of the total staked credits, the user can validate 10% of the total number of blocks (e.g., a 10% chance to perform the block validation). This results in an all-or-nothing random draw based on percentage stake. In order to achieve a validation take-over, a user would have to continually increase its stake contribution until achieving at least 51% of the total staked credits. However, it would not be in the best interest of a user with a 51% stake to attack a network in which the user holds a majority share of the total staked credits. Accordingly, the value of the credits are driven up over time, which places transaction validation further out of reach.

In view of the above, a fully public ledger can store all transaction data on the ledger in perpetuity, which means that the ledger continues to grow in size. Thus, storage for such ledgers can become prohibitively costly over time. Moreover, consensus methods, such as proof-of-work and proof-of-stake methods, can become prohibitively costly and/or can contribute to energy and resource waste.

Aspects of the present disclosure address the above and other deficiencies by providing distributed ledger networks implementing synchronous trust consensus models. A distributed ledger network described herein can include a distributed ledger system having nodes. Each node can generate content blocks, where each content block records one or more transactions. A transaction can include data to be stored on the ledger, and the content block can, in addition to transaction data, include a digest of the data stored on the previous content block. More specifically, the distributed ledger system can include one or more groupings of nodes, referred to as synchronization ("sync") groups, where each node of a sync group stores a copy of a transaction generated within the sync group. The synchronous trust consensus model can employ a consensus scheme that alternates synchronous and asynchronous consensus levels for improved (e.g., indefinite) transaction scalability and data throughput. To address the unbounded ledger growth problem, the network can perform end-of-life actions with respect to portions of the ledger and/or archive portions of the ledger to minimize space requirements. A consensus support system can be provided to support the consensus scheme performed by the distributed ledger system. For example, the consensus scheme can include a primary consensus tier to implement primary consensus, a bridge consensus tier to implement bridge consensus, and a global consensus tier to implement global consensus. Each of the primary consensus, bridge consensus and global consensus can be performed after respective synchronization periods. Further details regarding primary consensus, bridge consensus and global consensus are provided herein below.

The synchronous trust consensus model can implement a trust-based incentive model to incentivize participation in consensus. The trust-based incentive model described herein utilizes what is referred to as a "proof-of-trust" method to incentivize consensus participation over time based on trust. More specifically, a trust value or score can be assigned to a node that is updated based on participation in consensus. To obtain a higher trust value, a node must successfully participate in the consensus scheme. For example, since primary consensus, bridge consensus and global consensus are time-sensitive in view of their respective synchronization periods, the longer that a node goes without (successful) participation, the lower its trust value will be. Similarly, if a node misses consensus, its trust value will decrease. The consensus model can further incentivize consensus participation by implementing a digital currency structure. The digital currency structure can be based on credit tokens ("credits") that are designed to be stable and not "float" in relation to market forces. Further details regarding the trust-based incentive model and digital currency structure are provided herein below.

Advantages of the present disclosure include, but are not limited to, improved distributed ledger consensus efficiency, reduced resource usage, etc.

FIG. 1 is a block diagram of a distributed ledger network ("network") 100 for implementing synchronous trust consensus, in accordance with some embodiments of the present disclosure. As shown, the network 100 includes a number of synchronization ("sync") groups 110-1 and 110-2 each including a number of nodes. For example, the sync group 110-1 includes nodes 112-1 through 112-3. As will be described in further detail below, a sync group generally refers to a collection of nodes that participate together in primary consensus. Although only two sync groups are shown and three nodes are shown in the sync group 110-1, the network 100 can include any suitable number of sync groups, and each sync group can include any suitable number of nodes, in accordance with the embodiments described herein. However, such sync group should include at least 3 nodes.

The network 100 can be used to improve transaction scaling capability by implementing parallel side-chaining to improve data throughput. More specifically, each node can create its own data (e.g., blocks) on an individualized side-chain. For example, within the sync group 110-1, each of the nodes 112-1 through 112-3 can receive data to generate a content block. Each content block includes the digest (e.g., hash) of the data and the digest of the previous content block. To initialize a ledger, the initial digest can be provided by a primary synchronization block. A new sync group entering the network 100 would perform in relatively the same manner, with content block creation and transaction rates being limited to the performance of the individual nodes included in the new sync group.

In some embodiments, privacy operations for a particular use case can be implemented by a trusted brokering agent ("agent") 120. For example, the agent 120 can execute transaction contracts to control public and private data authorized for the node 112-1, which can help keep private information private. More specifically, the agent 120 can receive data from a user interface, wherein the agent 120 can pass public data to the node 112-1 and pass private data for storage in an offline database 130. The output of the execution of a transaction contract can be placed on the ledger of the node 112-1 as an object indicative of a state. An example of a state is a number of payments remaining on a contract. Execution of the transaction contract in the next block of the ledger updates the state (e.g., reduces the number of remaining payments). Each block can be digitally signed using a certificate of each party involved to provide non-repudiation of the corresponding transaction. Accordingly, since the private portion of a certificate can only be accessed by the owner of the certificate, any block that is digitally signed with the certificate is assumed to have come from the owner.

Each of the sync groups 110-1 and 110-2 corresponds to a grouping of nodes for sharing content blocks and performing consensus within the network 100. That is, in addition to a node locally storing the content block on its own ledger, a copy of the content block can be sent to the other nodes in the sync group to ensure that consensus is established and maintained. For example, the node 112-1 can send a content block it has created to the nodes 112-2 and 112-3. Content blocks can be written on multiple side-chains simultaneously. A side-chain is an auxiliary chain that is linked to, and runs in parallel with, a primary chain (e.g., "main-chain"). For example, the node 112-1 can store multiple ledgers in the form of respective side-chains, wherein one ledger is a ledger of its own transaction records, another ledger is a ledger of the transaction records of the node 112-2, and another ledger is a ledger of the transaction records of the node 112-3. Thus, the sync group 110-1 can be a minimal grouping of nodes that store redundant copies of the entire content of each side-chain. These side-chains, each independently created by one of the nodes, can include different numbers of blocks each with different requirements for consensus.

The node that had initiated the creation of the sync group is automatically designated as a sync group leader. For example, if node 112-1 created the sync group 110-1, then node 112-1 would be designated as the sync group leader of the sync group 110-1. As will be described in further detail herein, the sync group leader can lead its corresponding sync group in performing consensus operations within the network 100.

Once a sync group has been created, it cannot be modified by the sync group leader or other entity (e.g., nodes cannot be actively added to or removed from the sync group by the sync group leader). Instead, to modify membership of a current sync group, a new sync group can be created and the current sync group can be disbanded. A node can voluntarily opt to leave the sync group. However, as will be described below, such a node can suffer a trust penalty for doing so.

In some embodiments, a matching service can be used to identify candidate nodes to create a sync group. The matching service can operate, for example, by displaying a list of nodes that are looking to participate in a sync group. For example, the matching service can be hosted by a consensus support system 140 of the network 100. In some embodiments, the consensus support system 140 includes a number of consensus support platforms. For example, a root consensus support server can be placed in a number of locations to support the operations of the network 100.

To implement consensus with respect to both asynchronous manual user actions and the synchronous periodicity of node data creation, the nodes can employ a consensus scheme that alternates between synchronous and asynchronous consensus tiers using the parallel side-chaining for improved scalability. For example, asynchronous user actions can generate respective blocks inserted at the asynchronous sequences in which they are initiated. Synchronicity requirements can then be employed to restrict that consensus be made on time prior to resuming side-chain distributed ledger data creation according to the periodicity.

In some embodiments, the consensus scheme is implemented using a tiered consensus control structure including a number of independent consensus tiers. The consensus tiers can include a primary consensus tier to implement primary consensus operations, a bridge consensus tier to implement bridge consensus operations, and a global consensus tier to implement global consensus operations. The primary consensus tier and the global consensus tier are synchronous consensus tiers, while the bridge consensus tier is an asynchronous consensus tier that functions as a bridge between the primary consensus tier and the global consensus tier. As will be described in further detail below, the consensus support system 140 can be used to support the consensus scheme for synchronizing transactions or exchanges of tokens between sync groups and/or nodes. Tokens can be used as a decentralized currency to govern the creation of content blocks by nodes within the network 100. Examples of tokens include credit tokens ("credits"), stamps, etc. Further details regarding tokens will be described in further detail below.

With respect to the primary consensus tier, the nodes 112-1 through 112-3 (as members of the sync group 110-1) participate together in a primary consensus method. The primary consensus method is performed by each node locally within the sync group (e.g., the primary consensus method for the sync group 110-1 occurs without involvement of other nodes or entities within the system 100). In the sync group 110-1, each of the nodes 112-1 through 112-3 synchronizes the content blocks it has generated over a primary synchronization period with one another to generate a primary consensus chain including a primary consensus block.

For example, as will be described in further detail below, a primary consensus block for the sync group 110-1 can be created by combining the digests of the data of the last content blocks generated by each of the nodes 112-1 through 112-3. The primary consensus blocks are produced simultaneously by each node based on the order of nodes listed in the sync group. Signatures of each node can also appear in this order and must be matched by all nodes in the sync group. A primary consensus block can include a summary of tokens (e.g., credits and stamps) and trust value, based on the number of content blocks created by each node over the preceding period since the creation of the last primary consensus block. The primary consensus blocks for the sync group 110-1 are maintained locally by the sync group 110-1.

The primary synchronization period can be used to address latency by reducing data storage requirements on duplicate distributed ledgers to a manageable size. The primary synchronization period can be controllable by a global configuration setting of a set of global configuration settings. The set of global configuration settings can be provided by a governance organization associated with the network 100. In some embodiments, the primary synchronization period is 10 minutes. The primary consensus tier can require a suitable amount of successful consensus of each node 112-1 through 112-3. In some embodiments, the primary consensus tier requires 100% successful consensus. For example, if any of the nodes 112-1 through 112-2 of the sync group 110-1 misses consensus, primary consensus for the sync group 110-1 fails. Further details regarding the creation of primary consensus blocks will be described below with reference to FIG. 2.

Figure 2:
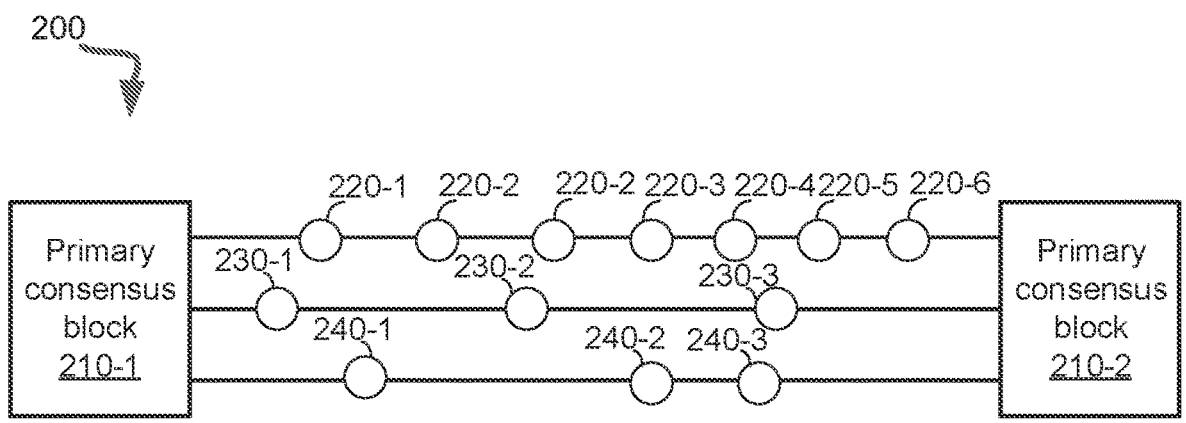
FIG. 2 is a diagram illustrating an example of the creation of a primary consensus block, in accordance with some embodiments of the present disclosure.

FIG. 2 is a diagram 200 illustrating an example of the creation of a primary consensus block, in accordance with some embodiments of the present disclosure. Generally, a primary consensus block for a sync group is created based on the last content blocks generated by each node of the sync group during the synchronization period. For example, as shown, the diagram 200 illustrates a first primary consensus block 210-1 that was created by a sync group (e.g., sync group 110-1) at a first time. A number of content blocks have been generated by the nodes of the sync group during a synchronization period after the creation of the primary consensus block 210-1. For example, content blocks 220-1 through 220-6 have been created by a first node of the sync group (e.g., node 112-1 of FIG. 1), content blocks 230-1 through 230-3 have been created by a second node of the sync group (e.g., node 112-2 of FIG. 1), and content blocks 240-1 through 240-3 have been created by a third node of the sync group (e.g., node 112-3 of FIG. 1). Once the time limit defined by the synchronization period has been reached (e.g., 10 minutes), a second primary consensus block 210-2 is created. More specifically, the primary consensus block 210-2 can be created by synchronizing the last content blocks generated by each node (e.g., content blocks 220-6, 230-3 and 240-3).

Referring again to FIG. 1, at the bridge consensus tier, bridge consensus is performed by synchronizing a set of primary consensus blocks to create a bridge consensus block. That is, the bridge consensus tier can be entered into by multiple sync groups of the network 100 (e.g., sync groups 110-1 and 110-2), and can be performed asynchronously when required to perform exchanges of value, renewal of transaction licenses, establishment of global parameters, etc. For example, the sync group leader for each sync group can be tasked with providing the primary consensus blocks of its sync group to a consensus support system 140 to manage the bridge consensus process.

As mentioned above, the bridge consensus operation is performed asynchronously by each sync group, which means that it can be entered into by a sync group without respect to a synchronization period. However, a bridge consensus threshold period can be defined that indicates a maximum amount of time that a sync group can go without participating in bridge consensus. The bridge consensus threshold period can be a global configuration setting of the set of global configuration settings. In some embodiments, the bridge consensus threshold period should not exceed 8 hours. For example, the bridge consensus threshold period can be 6 hours. In this example, the sync group 110-1 should participate in at least one bridge consensus operation within 6 hours of a previous bridge consensus operation to be compliant. If the sync group 110-1 does not participate in bridge consensus in this 6 hour window, the sync group 110-1 can be penalized (e.g., reduced trust and/or temporary or permanent banishment from the network 100).

Similar to sync group creation, a matching service can be provided by the consensus support service 140 to identify candidate sync lists to enter bridge consensus. Before nodes and/or sync groups can resume other activities (e.g., primary consensus participation), bridge consensus verification can be performed to determine whether bridge consensus was successful. Further details regarding the creation of bridge consensus blocks will be described below with reference to FIG. 3.

Once approved, the bridge consensus block can be added to a bridge chain that maintains records of bridge consensus blocks generated within the network 100. Once approved, the bridge consensus block can be added to a bridge chain for a sync group. In addition to the bridge consensus block, the bridge chain can further include a bridge sync block and a bridge summary block. The bridge sync block can include initial states of the sync groups participating in the bridge consensus, and the bridge summary block can include a list of all active sync groups within the network 100. The bridge consensus block can be sent to the consensus support service 140 for verification and approval to ensure that the bridge consensus block is accurate and has not been tampered with or artificially created.

In addition to the primary consensus block described above, the primary sync group chain can include a primary sync block and a link block. The primary sync block can include an initial state of the sync group 110-1, and can contain the post-bridge state of each of the sync groups and nodes that participated in the creation of a bridge consensus block during bridge consensus (as will be described in further detail below). This may include any changes which took place during bridge consensus (e.g., token transactions or exchanges), as will be described in further detail below. The primary sync block is the first block which must be created prior to each of the nodes producing any individual content blocks.

The link block can include the state of each sync group and nodes which are petitioning to participate in an upcoming bridge consensus operation. The link block contains requests for transfer or exchange of tokens (e.g., credits or stamps) to occur in the bridge consensus operation and the party which is slated to participate in the individual peer-to-peer exchange of tokens. For example, the link block can capture intended token exchanges between nodes of different sync groups. Link blocks can include the anticipated list of known sync groups which may be expected or required to participate in the upcoming bridge consensus operation.

A threshold condition may need to be satisfied to successfully enter into bridge consensus. The threshold condition can be predetermined as a global configuration setting of the set of global configuration settings. In some embodiments, the threshold condition corresponds to a threshold number of nodes that are needed to invoke bridge consensus. For example, the threshold number of nodes can be defined as a share of the total outstanding nodes of the network 100. Illustratively, if there are 1,000 total outstanding nodes in the network 100 and the threshold number of nodes is defined as 10% of the total outstanding nodes in the network 100, then a minimum of 100 nodes are needed to participate in bridge consensus. In some embodiments, the threshold condition corresponds to a threshold amount of trust. For example, the threshold amount of trust can be defined as a percentage of the total trust of all the nodes within the network 100. Illustrative, if the total trust within the network 100 is 1,000,000 and the threshold amount of trust is defined as 10% of the total trust within the network 100, then a minimum total trust of 100,000 is needed to participate in bridge consensus.

Figure 3:
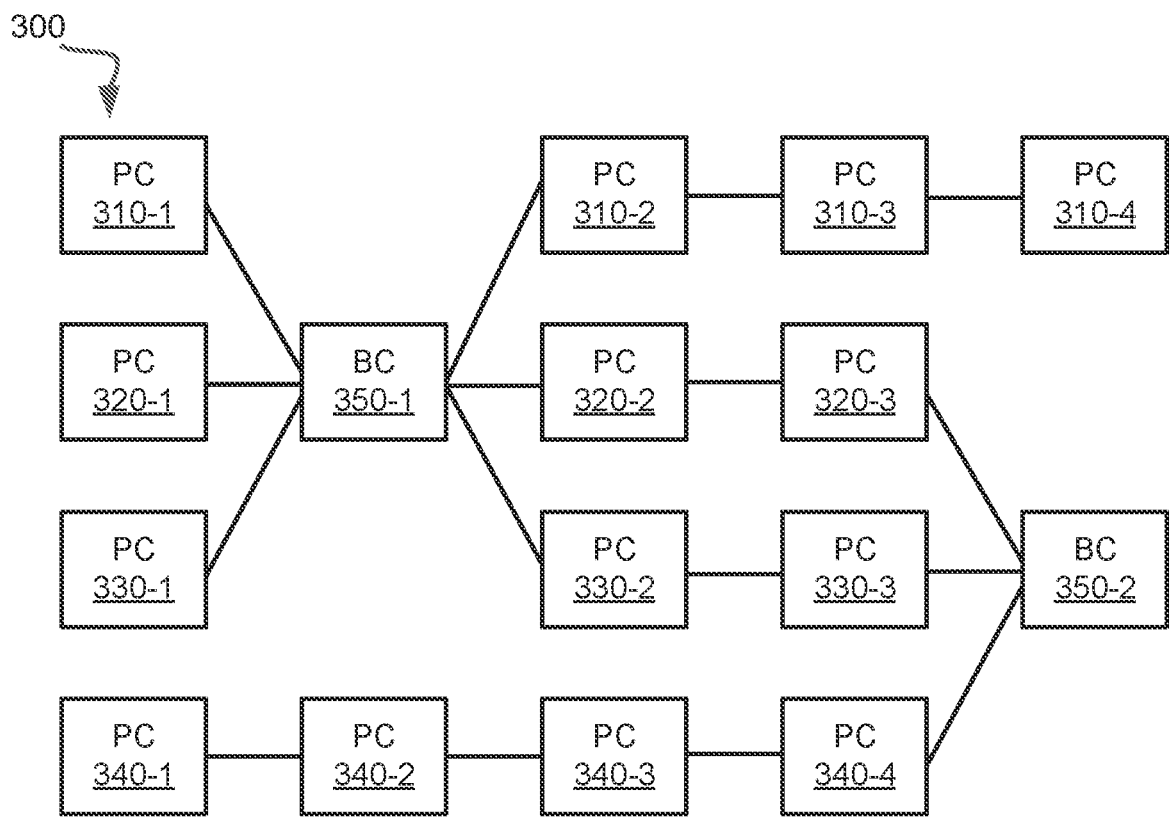
FIG. 3 is a diagram illustrating an example of the creation of a bridge consensus block, in accordance with some embodiments of the present disclosure.

FIG. 3 is a diagram 300 illustrating an example of the creation of a bridge consensus block, in accordance with some embodiments of the present disclosure. As shown, the diagram 300 includes a number of primary consensus blocks (PC) each corresponding to a last PC created by a respective sync group during a primary consensus process performed prior to a first bridge synchronization period. For example, PC 310-1 corresponds to a first sync group, PC 320-1 corresponds to a second sync group, PC 330-1 corresponds to a third sync group, and PC 340-1 corresponds to a fourth sync group. After the bridge synchronization period, at least the sync groups corresponding to PC 310-1 through PC 330-1 participate in bridge consensus process to synchronize data by creating a first bridge consensus block (BC) 350-1 that includes the PCs 310-1 through 330-1, while the fourth sync group (which is not included in the bridge consensus process performed by the first, second and third sync groups) performs a primary consensus process to create another PC 340-2. Other sync groups (not shown) may also participate in the bridge consensus process. It is assumed that the number of sync groups participating in the first bridge consensus process satisfies the threshold condition, as described above with reference to FIG. 1. Although three sync groups are shown as participating in the first bridge consensus process in this example, any suitable number of sync groups can participate in the first bridge consensus process in accordance with the embodiments described herein.

As further shown, after another primary synchronization period has elapsed, each of the sync groups participates in another primary consensus process to create PC 310-2 through PC 330-2, and PC 340-3 as described above with reference to FIGS. 1 and 2. Then, after another primary synchronization period has elapsed, each of the sync groups participates in yet another primary consensus process to create PC 310-3 through PC 330-3, and PC 340-4 as described above with reference to FIGS. 1 and 2. After a second bridge synchronization period has elapsed, at least the sync group corresponding to PC 320-3, PC 330-3 and PC 340-4 participate in a second bridge consensus process to create a second BC 350-2 that includes the PCs 320-3, 330-3 and 340-4, while the first sync group (which is not included in the bridge consensus process performed by the second, third and fourth sync groups) performs primary consensus to create another PC 310-4. Accordingly, different subsets of sync groups can participate in respective bridge consensus processes to create bridge consensus blocks, as long as the subset of sync groups satisfies the threshold condition.

Referring again to FIG. 1, bridge consensus overhead can grow linearly in relation to scaling of the network 100 (e.g., increase in the number of sync groups within the network 100). Growth impact from the growth of bridge consensus operations can be manageable as the bridge consensus block also exhibits linear growth in relation to the scaling of the network 100. This is because bridge consensus operations grow in size on a sync group basis (as opposed to individual nodes). Additionally, bridge operations are performed asynchronously, such that the creation of content blocks by nodes of a sync group does not need to stop during bridge consensus. Once the bridge consensus is complete, the primary consensus operations can continue by redefining the linking of any created content data that is queued during bridge consensus.

At the global consensus tier, bridge consensus block synchronization is managed by the consensus support system 140 to create a global consensus block. For example, the global consensus synchronization can occur once a day, such that the bridge synchronization period can be set for 24 hours. Global consensus further helps to eliminate double spend across the entire network 100, provides a global compliance control feature, and enables a global governance capability. The consensus support system 140 (e.g., all active root-level consensus support platforms) and a majority percentage of active nodes, can participate in the election process for global consensus. Further details regarding the creation of global consensus blocks will be described below with reference to FIG. 4.

To successfully participate in a global consensus operation, a particular set of sync groups can participate in a "final" bridge consensus process to create a current bridge consensus block that includes the most current data for global synchronization. In the event that the set of sync groups is unable to create the current bridge consensus block, the last successful bridge consensus block created by the set of sync groups can be used to ensure that content blocks created prior to the bridge consensus are included in the global consensus. However, the sync groups of the set of sync groups will be forced to lose all data after the latest created bridge consensus block. An exception to this is a requirement that nodes are only permitted to forgo global consensus for a limited/threshold number of times. For example, a node can be placed in an inactive status if the node misses a threshold number of missed global consensus operations (e.g., three global consensus operations). If the node remains in the inactive status for a certain amount of time (e.g., 30 days), the node is removed from the network 100 and can re-register to regain entry into the network 100. The threshold number of global consensus operations and amount of time can be defined as a global configuration setting of the set of global configuration settings. A similar punishment can be implemented for missing primary and/or bridge consensus.

Global consensus operations can be limited in growth as they scale due to the growth in the number of bridge consensus operations. The network can limit this impact by continuously creating the bridge consensus content throughout the span of time between subsequent global consensus operations. As with the bridge consensus operations, the global consensus operations can occur as a background process supported by all of the nodes working in concert. Any content block data created during this background process can also be queued and retroactively linked by reassigning the digest chains after the global consensus is complete.

Figure 4:
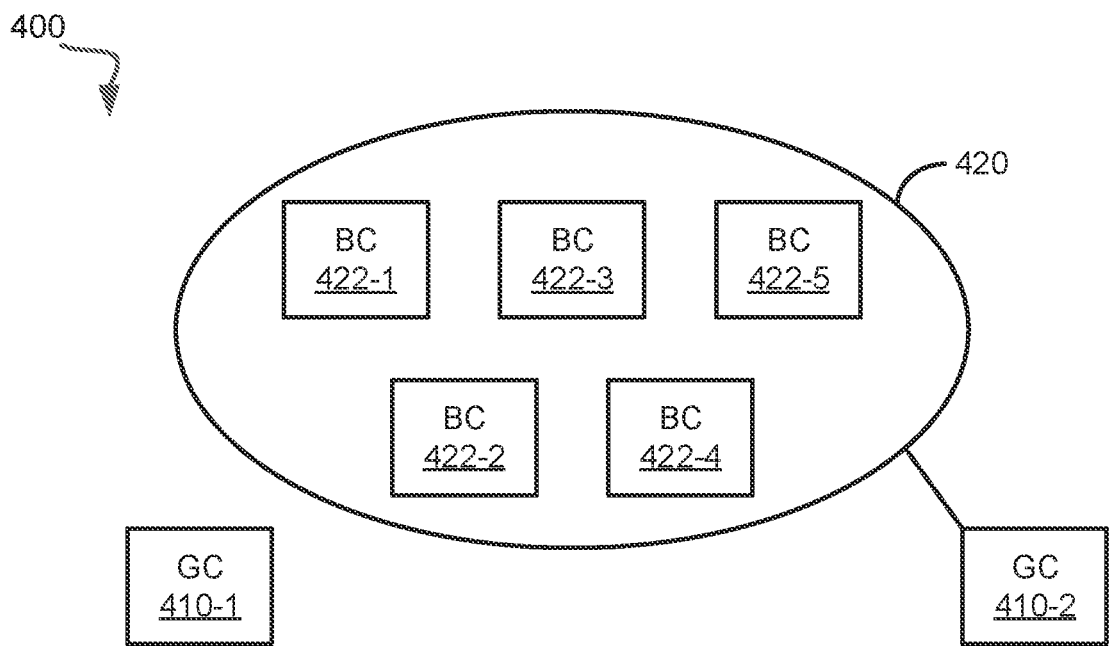
FIG. 4 is a diagram illustrating an example of the creation of a global consensus block, in accordance with some embodiments of the present disclosure.

FIG. 4 is a diagram 400 illustrating an example of the creation of a global consensus block, in accordance with some embodiments of the present disclosure. As shown, the diagram 400 includes a first global consensus block (GC) 410-1. GC 410-1 can be created at least in part from bridge consensus blocks (BCs) (not shown) that were received by the consensus support system during a first global synchronization period (e.g., 24 hours). As further shown, a second GC block 410-2 is created. More specifically, the second GC block 410-2 is created based on a set of BCs 420. The set of BCs 420 include BCs created after the creation of the GC 410-1 during a second global synchronization period after the end of the first global synchronization period (e.g., 24 hours after the creation of GC 410-1). The set of BCs 420 in this non-limiting example is shown including BCs 422-1 through 422-5, and the GC 410-2 is created at least in part from the BC's 422-1 through 422-5. However, the number of BCs should not be considered limiting. Accordingly, the BCs can be globally synchronized daily.

Referring again to FIG. 1, although bridge consensus is performed on an as-required basis, the set of global configuration settings can include another global configuration setting defining a maximum timespan between successful bridge consensus operations. When the maximum timespan is reached, the nodes of a sync group (e.g., nodes 112-1 through 112-3) cannot continue creating their side-chains or performing primary consensus operations until they have achieved a bridge consensus. The maximum timespan setting can ensure the systematic participation in the global consensus by a sync group, which can be offline or otherwise restricted from participating in global consensus.

The bridge consensus process can help resolve "double-spend" attacks, in which participants in the network 100 attempt to participate in multiple transactions concurrently at the expense of other participants. To do so, the bridge consensus process can use larger quorum slices to verify the primary consensus operations performed during the bridge synchronization period, and can provide higher certainty protection against such double-spend attacks. Although double-spend may not be fully resolved until transactions reach the global consensus tier, the bridge consensus operation can confirm the calculation for the primary consensus tier, thereby enabling forensic inclusion of each side-chain through verification by a larger percentage of distributed ledgers.

Each node can perform verification operations with respect to the ledgers maintained on the node. Examples of operations include checking the validity of data formatting, digests (e.g., hash value), and timestamps to ensure that the ledgers are correctly built. More advanced operations can be performed by the node, such as checking digest validity using other the public keys of the other nodes, verifying transactions by examining block history, correlating consensus participants with sync groups on the consortium, and re-queueing parts of the self-created ledger in the case of a failed consensus. These verification steps can add credibility to the consensus operations, as a properly functioning distributed ledger system would not verify a consensus that contains invalid or fraudulent data. Each node can identify itself using an identifier (e.g., the node 112-1 can identify itself using an identifier of the agent 120), and can sign consensus blocks using a corresponding private key.

The network 100 can incorporate a trust-based incentive model based on participation in the synchronous consensus process (e.g., primary consensus, bridge consensus and global consensus) to quantify trust over time, as opposed to a transaction-proof-based incentive model based on data mining (e.g., mining). Thus, the trust-based incentive model can reduce energy waste and thus increase energy efficiency. For example, if a node and/or sync group misses consensus, the node and/or sync group can lose trust within the network 100, making the node and/or sync group a less desirable partner for performing consensus operations. To prevent "rogue nodes" from falsifying consensus data to meet consensus after the fact, the consensus support system 140 can implement a falsification protection scheme that ensures data consistency. Moreover, a trust penalty can be imposed for disbanding a sync group, and a node can lose trust upon leaving a sync group. In addition, to maintain data synchronization across the network 100, any consensus blocks generated by a node and/or sync group that missed consensus are considered invalid and are lost.

The consensus model can incentivize consensus participation by implementing a digital currency structure. As mentioned above, the digital currency structure can be based on tokens that are designed to be stable and not "float" in relation to market forces. With respect to sharing transactions with other nodes within a sync group, the digital currency structure can provide a reward of a single credit to a node for each content block received from another node, while debiting a single credit from the node for each transaction submitted to another node. For example, if a sync group includes three nodes, then a node that has created a content block can lose two credits since the content block creator submits the transaction to the other two nodes of the sync group. That is, as part of the primary consensus operation, the sync group can implement a net-zero calculation for credit exchange based on the number of content blocks that have been created and sent during the primary synchronization period. At the end of the primary synchronization period, the credit totals can be recorded into the primary consensus block.

To illustrate the token exchange structure with respect to credits, assume that each of the nodes 112-1 through 112-3 initially has zero credits. First, the node 112-3 creates a content block and submits that content block to the nodes 112-1 and 112-2. Each content block submission can correspond to −1 credits for the sending node and +1 credits for the receiving node. At this point, the node 112-3 has −2 credits, and the nodes 112-1 and 112-2 each have +1 credit. Then, the node 112-3 creates and sends another content block, such that the node 112-3 has −4 credits and the nodes 112-1 and 112-2 each have +2 credits. Now, the node 112-1 creates and sends a content block, such that the node 112-1 has 0 credits, the node 112-2 has +3 credits, and the node 112-3 has −3 credits.

If node 112-1 and node 112-3 simultaneously create and send a content block, then node 112-1 will have −1 credits (i.e., −2 credits for sending the content block and +1 credit for receiving the content block from node 112-3), node 112-2 will have +5 credits, and node 112-3 will have −5 credits (i.e., −2 credits for sending the content block and +1 credit for receiving the content block from node 112-3). If all three nodes 112-1 through 112-3 simultaneously create and send a content block, then there is no net change to the credits.

After the primary synchronization period has ended, the primary consensus block can maintain a set of tallied data related to node participation during the primary synchronization period. For example, the set of tallied data can include a tally of available credits for each of the nodes in the sync group. For example, assume that the node 112-1 started with 10,000 available credits, the node 112-2 started with 250 available credits, and the node 112-3 started with 6,330 available credits. Further assume that, during the primary synchronization period, the node 112-1 has +5 credits, the node 112-2 has +16 credits, and the node 112-3 has −20 credits. Thus, the primary consensus block will be updated to reflect that the node 112-1 has 10,004 available credits (i.e., 10,000+4), the node 112-2 has 266 available credits (i.e., 250+16), and the node 112-3 has 6,310 available credits (i.e., 6,330−20).

As another example, the set of tallied data can include a tally of available stamps for each of the nodes in the sync group. Stamps are custom tokens, defined in addition to the credit tokens described above, that enable the pre-selling of allowed content blocks of a particular type defined by a transaction contract and/or license type. Stamps can be defined and controlled by a private ledger, but may be exchanged between nodes for consumption to create a content block. The number of available stamps for a given node can be reduced in proportion to the number of blocks created by the given node (e.g., a 1:1 reduction). For example, assume that the node 112-1 started with 8,762 stamps, the node 112-2 started with 50 stamps, and the node 112-3 started with 2,500 stamps. As mentioned above, during the primary synchronization period, the node 112-1 created 5 blocks, the node 112-2 created 1 block, and the node 112-3 created 13 blocks. Thus, the primary consensus block will be updated to reflect that the node 112-1 has 8,757 available stamps (i.e., 8,762−5), the node 112-2 has 49 available stamps (i.e., 50−1), and the node 112-3 has 2,487 available stamps (i.e., 2,500−13). Accordingly, a stamp can be viewed as a license for a node to create a content block.

As yet another example, the set of tallied data can include a credit floor tally. The credit floor tally for a given node indicates the minimum number of credits that the given node can possess in order to create a block within the sync group 110-1. The credit floor tally is updated by adding the total number of blocks created within the sync group 110-1 during the primary synchronization period. For example, assume that the node 112-1 started with a credit floor tally of 4,247, the node 112-2 started with a credit floor tally of 0, and the node 112-3 started with a credit floor tally of 2,000. As mentioned above, during the primary synchronization period, the node 112-1 created 5 blocks, the node 112-2 created 1 block, and the node 112-3 created 13 blocks. Thus, the primary consensus block will be updated to reflect that the node 112-1 has a credit floor tally of 4,266 credits (i.e., 4,247+19), the node 112-2 has a credit floor tally of 19 credits (i.e., 0+19), and the node 112-3 has a credit floor tally of 2,019 (i.e., 2,000+19).

In some embodiments, the credit floor tally for each node is decreased by a decay value for the node (which can be rounded down). For example, if the decay value for the node 112-1 is 4.7, the decay value for the node 112-2 is 0.78, and the decay value for the node 112-3 is 10.7, then the node 112-1 will have a credit floor tally of 4,262 credits (i.e., $\lfloor 4,266-4.7 \rfloor$, where $\lfloor \cdot \rfloor$ is the floor function), then the node 112-2 will still have a credit floor tally of 0 credits (i.e., $\lfloor 0-0.78 \rfloor$) and the node 112-3 will have a credit floor tally of 2,008 credits (i.e., $\lfloor 2,019-10.7 \rfloor$). The decay value can be constant over a certain length of time. In some embodiments, the decay value is constant over 7 years. The decay value for each node can be determined using any suitable decay value calculation method in accordance with the embodiments described herein. The decay values can be set by the consensus support system 140 (e.g., during global consensus).

The set of tallied data, along with the digests (e.g., hash values) of the last blocks created by each nodes 112-1 through 112-3, are locked into the consensus block. In other words the primary consensus block includes the digest of the last block for each of the self-created ledgers. For example, if the node 112-1 created 5 blocks, the node 112-2 created 1 block, and the node 112-3 created 18 blocks, then the digests of the $5^{th}$ block of the first self-created ledger, the single block of the second self-created ledger, and the $18^{th}$ block of the third self-created ledger are included in the primary consensus block. The process of sending/receiving content blocks then continues, and thus a new set of tallied data can be generated at the end of the next primary synchronization period. Further details regarding the set of tallied data will now be described below with reference to FIG. 5.

Figure 5:
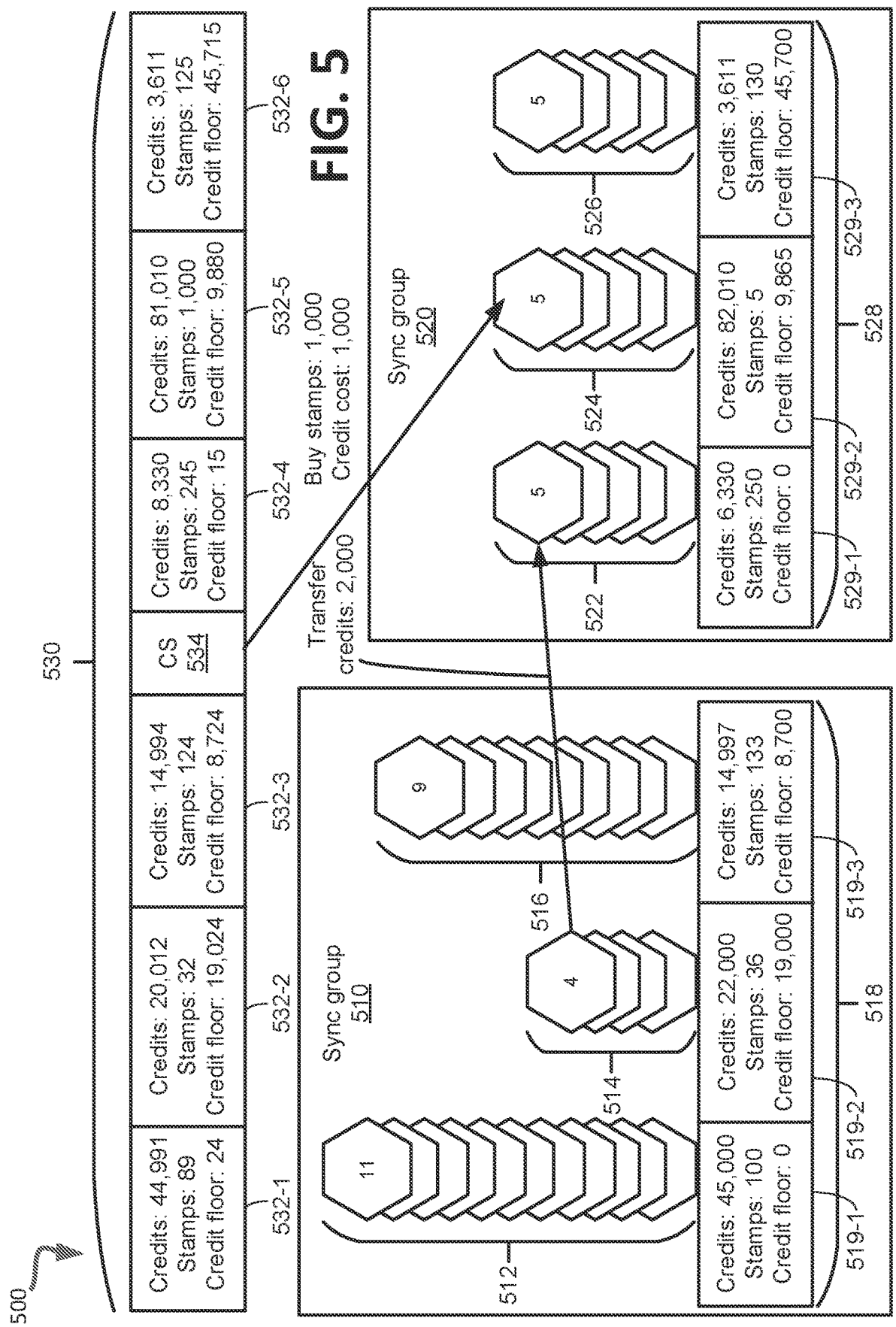
FIG. 5 is a diagram illustrating an example credit transaction between nodes, in accordance with some embodiments of the present disclosure.

FIG. 5 is a diagram 500 illustrating an example credit transaction between nodes, in accordance with some embodiments of the present disclosure. As shown, the diagram 500 includes sync group 510 and sync group 520. Sync group 510 includes a ledger 512 created by a first node, a ledger 514 created by a second node, and a ledger 516 created by a third node. Additionally, a primary consensus block 518 for the sync group 510 is shown. The primary consensus block 518 includes a set of tallied data 519-1 for the first node, a set of tallied data 519-2 for the second node, and a set of tallied data 519-3 for the third node. As shown, the set of tallied data 519-1 indicates 45,000 credits, 100 stamps, and a credit floor of 0. The set of tallied data 519-2 indicates 22,000 credits, 36 stamps, and a credit floor of 19,000. The set of tallied data 519-3 indicates 14,997 credits, 133 stamps, and a credit floor of 8,700. The primary consensus block 518 is assumed to have been created prior to the creation of the ledgers 512 through 516. Although three nodes are shown included in the sync group 510, any suitable number of nodes can be included in the sync group 510 in accordance with the embodiments described herein.

Sync group 520 includes a ledger 522 created by a fourth node, a ledger 524 created by a fifth node, and a ledger 526 created by a sixth node. Additionally, a primary consensus block 528 for the sync group 520 is shown. The primary consensus block 528 includes a set of tallied data 529-1 for the fourth node, a set of tallied data 529-2 for the fifth node, and a set of tallied data 529-3 for the sixth node. As shown, the set of tallied data 529-1 indicates 6,330 credits, 250 stamps, and a credit floor of 0. The set of tallied data 529-2 indicates 82,010 credits, 5 stamps, and a credit floor of 9,865. The set of tallied data 529-3 indicates 3,611 credits, 130 stamps, and a credit floor of 45,700. The primary consensus block 528 is assumed to have been created prior to the creation of the ledgers 522 through 526. Although three nodes are shown included in the sync group 520, any suitable number of nodes can be included in the sync group 520 in accordance with the embodiments described herein.

The ledger 512 indicates that the first node has created, written and sent 11 content blocks during a synchronization period after the creation of the primary consensus block 518, the ledger 514 indicates that the second node has created, written and sent 4 content blocks during the synchronization period after the creation of the primary consensus block 518, and the ledger 516 indicates that the third node has created, written and sent 9 content blocks during the primary synchronization period after the creation of the primary consensus block 518. The ledger 522 indicates that each of the fourth, fifth and sixth nodes have created, written and sent 5 content blocks during the synchronization period after the creation of the primary consensus block 528.

The diagram 500 further shows a bridge consensus block 530 obtained during bridge consensus. The bridge consensus block 530 synchronizes at least the sync groups 510 and 520. Other sync groups (not shown) can also be synchronized with respect to the bridge consensus block 530. As shown, the bridge consensus block 530 includes a set of tallied data 532-1 for the first node, a set of tallied data 532-2 for the second node, a set of tallied data 532-3 for the third node, a set of tallied data 532-4 for the fourth node, a set of tallied data 532-5 for the fifth node, and a set of tallied data 532-6 for the sixth node. The bridge consensus block 530 further includes a consensus support (CS) platform 534 (similar to the consensus support platform 140 of FIG. 1). The sets of tallied data 532-1 through 532-6 correspond to the change in credits, stamps and credit floor as a result of the activities performed by each of the nodes during the synchronization period.

For example, with respect to the sync group 510, the first bridge platform had consumed 11 stamps for the content blocks it created, transferred 22 credits for the content blocks it sent to the second and third nodes, and received 13 credits from the second and third nodes (i.e., 9+4). The second bridge platform had consumed 4 stamps for the content blocks it created, transferred 18 credits for the content blocks it sent to the first and third nodes, received 20 credits from the first and third nodes (i.e., 11+9), and transferred 2,000 credits to the fourth node. The third bridge platform had consumed 9 stamps for the content blocks it created, transferred 18 credits for the content blocks it sent to the first and second nodes, and received 15 credits from the first and second nodes (i.e., 11+4).

With respect to the sync group 520, the fourth, fifth and sixth bridge platforms each had consumed 5 stamps for the content blocks they created, transferred 10 credits for the content blocks they sent to the other nodes in the sync group, and received 10 credits from the other nodes (i.e., 5+5). In addition, the fourth node had received the 2,000 credits from the second node, and the fifth node had bought 1,000 stamps from the CS platform 534 at a cost of 1,000 credits. That is, 1 stamp costs 1 credit. However, the cost of stamps in this illustrative example should not be considered limiting.

In view of the activities described above, the set of tallied data 532-1 indicates 44,991 credits (45,000 starting credits−22 credits from block creation+13 credits from block receipt), 89 stamps (100 starting stamps−11 stamps consumed to create 11 blocks), and a credit floor of 24 (0 starting credit floor+24 total blocks created within the sync group 510). The set of tallied data 532-2 indicates 20,012 credits (22,000 starting credits−8 credits from block creation+13 credits from block receipt−2,000 transferred credits), 32 stamps (36 starting stamps−4 stamps consumed to create 4 blocks), and a credit floor of 19,024 (19,000 starting credit floor+24 total blocks created within the sync group 510). The set of tallied data 532-3 indicates 14,994 credits (14,997 starting credits−18 credits from block creation+15 credits from block receipt), 124 stamps (133 starting stamps−9 stamps consumed to create 9 blocks), and a credit floor of 8,724 (8,700 starting credit floor+24 total blocks created within the sync group 510). The set of tallied data 532-4 indicates 8,330 credits (6,330 starting credits−10 credits from block creation+10 credits from block receipt+2,000 received credits), 245 stamps (250 starting stamp−5 stamps consumed to create 5 blocks), and a credit floor of 15 (0 starting credit floor+15 total blocks created within the sync group 520). The set of tallied data 532-5 indicates 81,010 credits (82,010 starting credits−10 credits from block creation+10 credits from block receipt−1,000 credits spent to buy 1,000 stamps), 1,000 stamps (5 starting stamps−5 stamps consumed to create 5 blocks+1,000 purchased stamps), and a credit floor of 9,880 (9,865 starting credit floor+15 total blocks created within the sync group 520). The set of tallied data 532-6 indicates 3,611 credits (3,611 starting credits−10 credits from block creation+10 credits from block receipt), 125 stamps (130 starting stamps−5 stamps consumed to create 5 blocks), and a credit floor of 45,710 (45,700 starting credit floor+15 total blocks created within the sync group 520).

Referring again to FIG. 1, an independent trust value can be maintained for each node. The trust value encapsulates a trustworthiness of the node, similar to consumer confidence, and a higher trust value can unlock greater influence within the network 100. Thus, the trust value can provide a proper incentive for long-term effectiveness of operations with the network 100. Each time a consensus operation is performed, results of the consensus operation can be used to update the trust value (e.g., consensus participation for a node can increase the corresponding trust value).

For example, a newly added node can be registered with the network 100. Once registered, the newly added node can enter the synchronous consensus and can participate within the network 100, while gaining incentive rewards incrementally over time. The longer that a node goes without participating in the synchronous consensus process, the lower the trust value for that node within the network 100. Missing a consensus, for any reason, can cause a reduction to its trust value. Accordingly, each node can build a reputation for performance and strengthen its standing as it builds its trust rating over time.

Each node can verify the trust value of another node in the same manner as it calculates its own trust value. For example, if an erroneous consensus level produces a lower-level consensus not accepted at a higher-level consensus (e.g., the primary consensus is not accepted at the bridge consensus tier or the bridge consensus is not accepted at the global consensus tier), the content can be restructured with accurate calculations after the erroneous consensus level reestablishes synchronicity. Depending on the level of consensus (e.g., consensus tier), an acceptable quorum of nodes can agree on each other's calculation before accepting a node into consensus. Should a node be deemed a non-compliant node that fails to meet one or more consensus requirements (e.g., sequencing, timing and/or compliance requirements) and/or produces incorrect consensus calculations, the non-compliant node can be removed (e.g., removed from its sync group by the corresponding sync group leader) and the overall consensus operation can continue after the removal of the non-compliant node. Since enforcement is performed globally, if all nodes perform consensus correctly, each of the nodes can operate on the same software specification.

The network 100 can reduce storage requirements by incorporating management and end-of-life (EOL) planning for data to minimize the adverse effects of scaling over time, apply end-of-life criteria for data stored on the distributed ledger, and separate the reliance on legacy data from operational criteria. The network 100 can address distributed ledger visibility and user privacy by employing dynamic user-controlled features that allow for the separation of the transaction and off-ledger content, and can support regulatory compliance, jurisdictional control, and data management features for individual data owners to implement digital rights management (DRM). The network 100 can be used within a variety of use cases and/or can provide a number of capabilities. Examples of use cases and/or capabilities include: (1) elimination of proof-of-work energy waste; (2) patch management and version enforcement; (3) privacy of owner-creator content; (4) secondary data sale market; (5) self-sovereign identity; (5) private sector-issued licensing; (6) zero-trust expanded applications; (7) provide risk and trust relationships; (8) provide trust and quality relationships; (9) insurer and banking models; (10) disconnected governing and jurisdictional control; (11) enforcement and audit by legitimate authorities; (12) digital rights management (DRM); and (13) pre-paid models for security issuance.

FIG. 6 is a flow diagram of a method 600 for participating in synchronous trust consensus, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 600 can be performed by processing logic implementing a node within a sync group of a distributed ledger network (e.g., the node 112-1 of the sync group 110-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives data for generating a content block of a distributed ledger within a sync group including multiple nodes. The data corresponds to a transaction that will be recorded on the distributed ledger using the content block. In some embodiments, the data is received from a brokering agent of the distributed ledger network. However, the data can be received from any suitable component within the distributed ledger network (e.g., another node in the sync group).

At operation 620, the processing logic generates the content block using the data. The content block can include public data (e.g., block number, payload), as well as a digest (e.g., hash) to establish a digest chain. For example, the digest can be a digest of the previously generated block of the ledger. If the content block is an initial content block of the ledger, then the digest can be provided externally. For example, the initial digest can be provided by a primary consensus block.

At operation 630, the processing logic stores the content block on a corresponding ledger, and sends a copy of the content block to the other nodes of the sync group. For example, the ledger can be a side-chain. The other nodes can maintain the copy of the content block on a corresponding ledger (e.g., side-chain) corresponding to the node that generated the content block, in addition to their respective ledgers (e.g., side-chains).

At operation 640, the processing logic participates in a consensus process with the other nodes to generate a consensus block. Participating the in the consensus process can include communicating with a consensus support platform. The consensus block includes a digest of the last content block that was generated by each of the nodes of the sync group, as well as a set of tallied data related to a credit or digital currency structure. In some embodiments, the consensus block is a primary consensus block generated based on the sync group only. In some embodiments, the consensus block is a bridge consensus block generated based on multiple sync groups. In some embodiments, the consensus block is a global consensus block generated based on multiple bridge consensus blocks.

With respect to the primary and global consensus processes, participation in the primary and global consensus processes can be initiated in response to determining that a synchronization period has ended. In some embodiments, the synchronization period is a primary synchronization period between subsequent primary consensus operations (e.g., 10 minutes). In some embodiments, the synchronization period is a bridge synchronization period between subsequent bridge consensus operations. In some embodiments, the synchronization period is a global synchronization period between subsequent global consensus operations (e.g., 24 hours). With respect to the bridge consensus process, participation in the bridge consensus process is asynchronous in that it is not performed in accordance with a defined synchronization period. However, a bridge consensus threshold period can be imposed to require participation in at least one bridge consensus within the threshold period. In some embodiments, the bridge consensus threshold period is at most 8 hours. For example, the bridge consensus threshold period can be about 6 hours.

In some embodiments, the set of tallied data for each node includes a number of available credits, a number of available stamps, and a credit floor. For example, the number of available credits for each node can be reduced relative to the previously created consensus block (if one exists) based on the number of content blocks that the node has sent to the other nodes of the sync group during the synchronization period. The number of available stamps for each node can be reduced relative to the previously created consensus block (if one exists) based on the number of stamps that the node has used to create the content blocks during the synchronization period. The credit floor for each node can be increased relative to the previously created consensus block (if one exists) based on the number of content blocks that the node has received from the other nodes of the sync group.

Additionally, the number of available credits and/or the number of available stamps can be adjusted based on external transactions unrelated to content block creation and sending. For example, a node can receive and/or transfer credits to one or more other nodes during the synchronization period (either in the sync group or in a different sync group that it is not a member of). As another example, a node can buy stamps from the consensus support platform using its available credits. Further details regarding operations 610-640 are described above with reference to FIGS. 1-5.

FIG. 7 is a flow diagram of a method 700 for participating in synchronous trust consensus, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 700 can be performed by processing logic implementing a node within a sync group (e.g., the node 112-1 of the sync group 110-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic receives a copy of a content block from a node within a sync group and, at operation 720, the processing logic stores the copy of the content block. The content block can include public transaction data (e.g., block number, payload), as well as a digest (e.g., a hash) of a last content block of each individual distributed ledger maintained by the sync group to establish a digest chain. If the content block received from the node is an initial content block of the ledger, then the digest can be provided externally. For example, the initial digest can be provided by a consensus block.

At operation 730, the processing logic participates in a consensus process to generate a consensus block (similar to operation 640 of FIG. 6.). Further details regarding operations 710-730 are described above with reference to FIGS. 1-6.

FIG. 8 is a flow diagram of a method 800 for supporting synchronous trust consensus, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 800 can be performed by processing logic implementing a consensus support platform of a distributed ledger network (e.g., the consensus support platform 140 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic receives transaction data indicative of transactions performed by multiple nodes. More specifically, the transaction data can be received from one or sync groups each including a grouping of multiple nodes. For example, the data can include a number of available credits gained or spent by each of the nodes since a previous consensus (e.g. primary consensus, bridge consensus or global consensus), a number of stamps gained or spent by each of the nodes since the previous consensus, and the change in credit floor for each of the nodes since the previous consensus.

At operation 820, the processing logic generates a consensus block based on the transaction data. The consensus block can include a set of tallied data for each node obtained from the data, and a digest (e.g., hash) of the last content block of each individual distributed ledger maintained by the synchronization group. The set of tallied data for each node includes a number of available credits, a number of available stamps, and a credit floor. For example, the number of available credits for each node can be reduced relative to the previously created consensus block (if one exists) based on the number of content blocks that the node has sent to the other nodes of the sync group during the synchronization period. The number of available stamps for each node can be reduced relative to the previously created consensus block (if one exists) based on the number of stamps that the node has used to create the content blocks. The credit floor for each node can be increased relative to the previously created consensus block (if one exists) based on the number of content blocks that the node has received from the other nodes of the sync group. If a previous set of tallied data does not exists, then the set of tallied data is derived directly from the received data.

In some embodiments, the consensus block is a primary consensus block. Here, the primary consensus block is generated by synchronizing data received from a particular sync group of the distributed ledger network during a primary synchronization period (e.g., 10 minutes). Multiple primary consensus blocks can be generated each corresponding to a respective sync group within the distributed ledger network.

In some embodiments, the consensus block is a bridge consensus block. Here, the bridge consensus block is generated by synchronizing primary consensus blocks generated by multiple sync groups of the distributed ledger network. The bridge consensus block can be generated as part of an asynchronous process. Thus, the bridge consensus block can be viewed as a concatenation of primary consensus blocks of respective sync groups.

In some embodiments, the consensus block is a global consensus block. Here, the global consensus block is generated by synchronizing all of the bridge consensus blocks generated during a global synchronization period (e.g., 24 hours). Thus, the global consensus block can be viewed as a concatenation of bridge consensus blocks.

During the synchronization period, the processing logic can receive a request from a node to purchase resources (e.g., stamps) using credits. Thus, the processing logic can provide marketplace functionality with the distributed ledger network. Further details regarding operations 810 and 820 are described above with reference to FIGS. 1-7.

Figure 9:
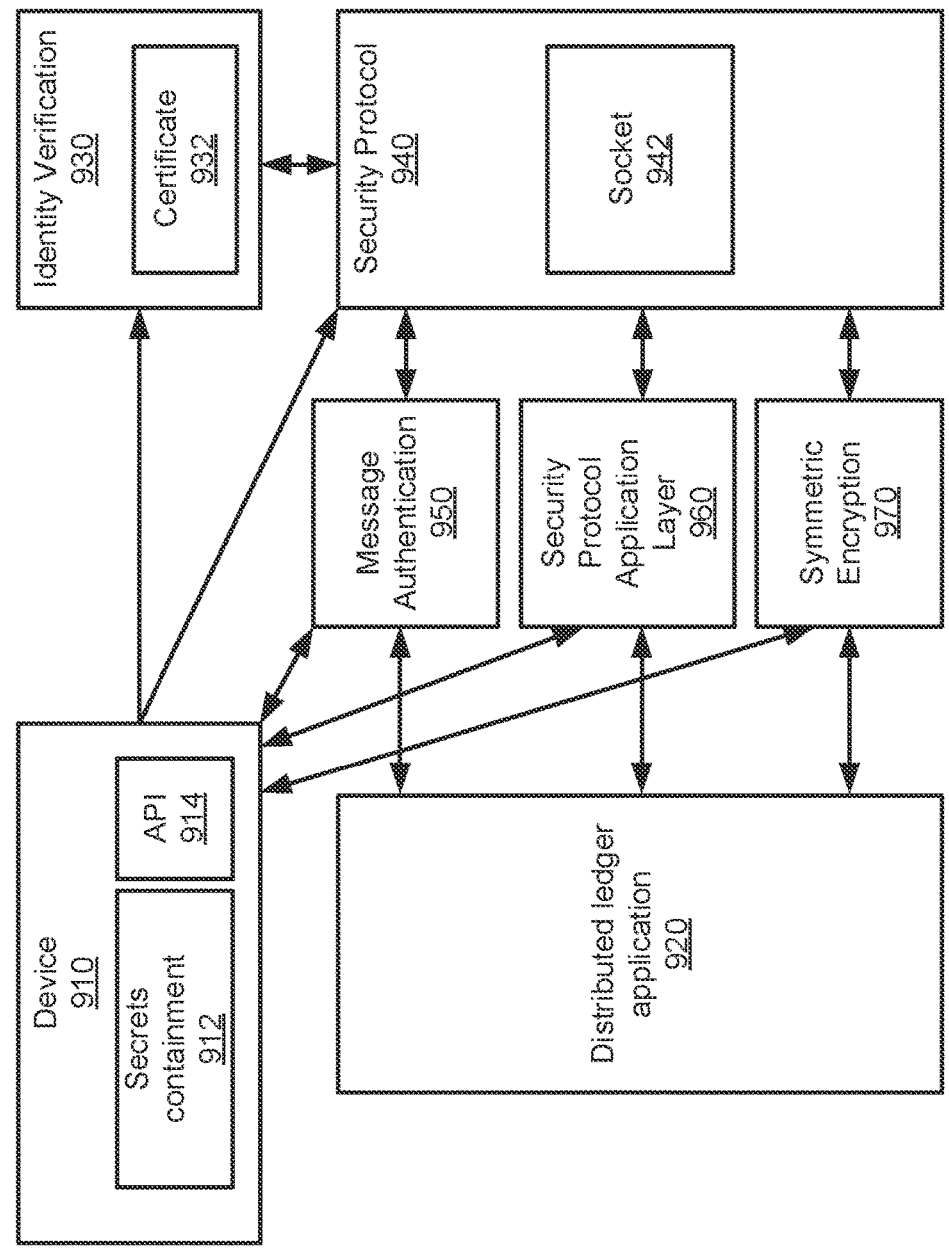
FIG. 9 is a block diagram of an example system for enabling cybersecurity features, in accordance with some embodiments of the present disclosure.

FIG. 9 is a block diagram of an example system 900 for enabling cybersecurity features, in accordance with some embodiments of the present disclosure. As shown, the system 900 can include a cryptographic trust enabled device ("device") 910. In some embodiments, the device 910 is an Internet of Things (IoT) device. The device 910 can include a secrets containment component 912 to process and maintain secrets data, and an API library ("API") 914 maintaining one or more sets of APIs for implementing API methods to establish cryptographic secure communications with other entities within the system 900. The secrets containment component 912 can include a protected integrated circuit (IC) having a protected memory. Examples a protected IC include a hardened System-on-Chip (SoC), a secure microprocessor, etc.

The system 900 can enable secure secrets provisioning and/or changing of cryptographic keys with respect to the device 910. For example, the secrets data can include a set of secrets data (e.g., secrets package) related to some provisioning state ("state") of the device 910. The set of secrets data can include a cryptographic key management block including a number of components to enable cryptographic functionality. In some embodiments, the set of secrets data is embodied as a non-fungible token (NFT). More specifically, the state can correspond to a certain segment of a supply chain in which the device is present. Examples of states include a manufacturer provisioning state in which the device is in possession of the device manufacturer, a vendor provisioning state in which the device is in possession of a vendor, a network provisioning state in which the device is allocated to at least one network segment, and an operational provisioning state in which the device is operational. Each state can be used to control the insertion of a corresponding set of secrets onto the device, such that the insertion of the set of secrets for a particular state places the device in the particular state. The set of secrets data can include a cryptographic key management block. Cryptographic key management generally refers to the handling, protection, canceling/revocation, transporting or logistical coordination of the cryptographic keys. For example, the device can maintain a set of vendor provisioning secrets on protected memory while in the vendor provisioning state, but would be unable to access the set of vendor provisioning secrets while in the manufacturer provisioning state. The device 910 can maintain a state machine that can track state progressions of the device, which can enable the provisioning of the device 910 with the appropriate set of components for the particular state.

The system 900 can further include a distributed ledger application 920. For example, the distributed ledger application 920 can be used to maintain transaction data for tracking the device 910 within a supply chain. The device 910 can communicate with the distributed ledger application 920 via one or more brokering agents. A brokering agent is a certified third party entity that functions as a broker or proxy between the device 910 and the distributed ledger application 920 to support cryptographically secure communications.

The system 900 can further include an identity verification component 930. The identity verification component 930 maintains a digital certificate (e.g., public key certificate) ("certificate") 932 used to perform identity verification for establishing secure communications. For example, the certificate 932 can be used to establish secure communications upon receiving a certificate signing request signed using a private key of a public/private key pair, where the certificate signing request includes the public key of the key pair. The certificate 932 can include the public key, identifiers of the issuer and requester, a certificate signature associated with a designated certificate signature method, etc. The certificate 932 binds the public key to the requester to ensure authenticity. The certificate 932 can be defined using any suitable format. In some embodiments, the certificate 932 is a certificate defined by the X.509 standard ("X.509 certificate").

The system 900 can further include a security protocol component 940. The security protocol component 940 can be used to implement a communication security protocol to provide secure communications, including privacy and data integrity, between applications within the system 900. For example, the security protocol 940 can utilize the certificate 932 described above. The communication security component 940 can maintain a network socket ("socket) 942 that functions as an endpoint for receiving and/or sending data within the system 900. The socket 942 can have a socket address including an IP address, port number, etc. The security protocol component 940 can implement any suitable communication security protocol in accordance with the embodiments described herein. In some embodiments, the communication security component 940 is a Transport Layer Security (TLS) component implementing a TLS protocol.

The device 910, via the API library 914, can be used to establish a variety of cybersecurity features. For example, the API library 914 can be used to establish secure communications with the distributed ledger application 920 and/or other devices within the system 900. Examples of cybersecurity features can include message authentication 950, a security protocol application layer 960, and symmetric encryption 970.

Figure 10:
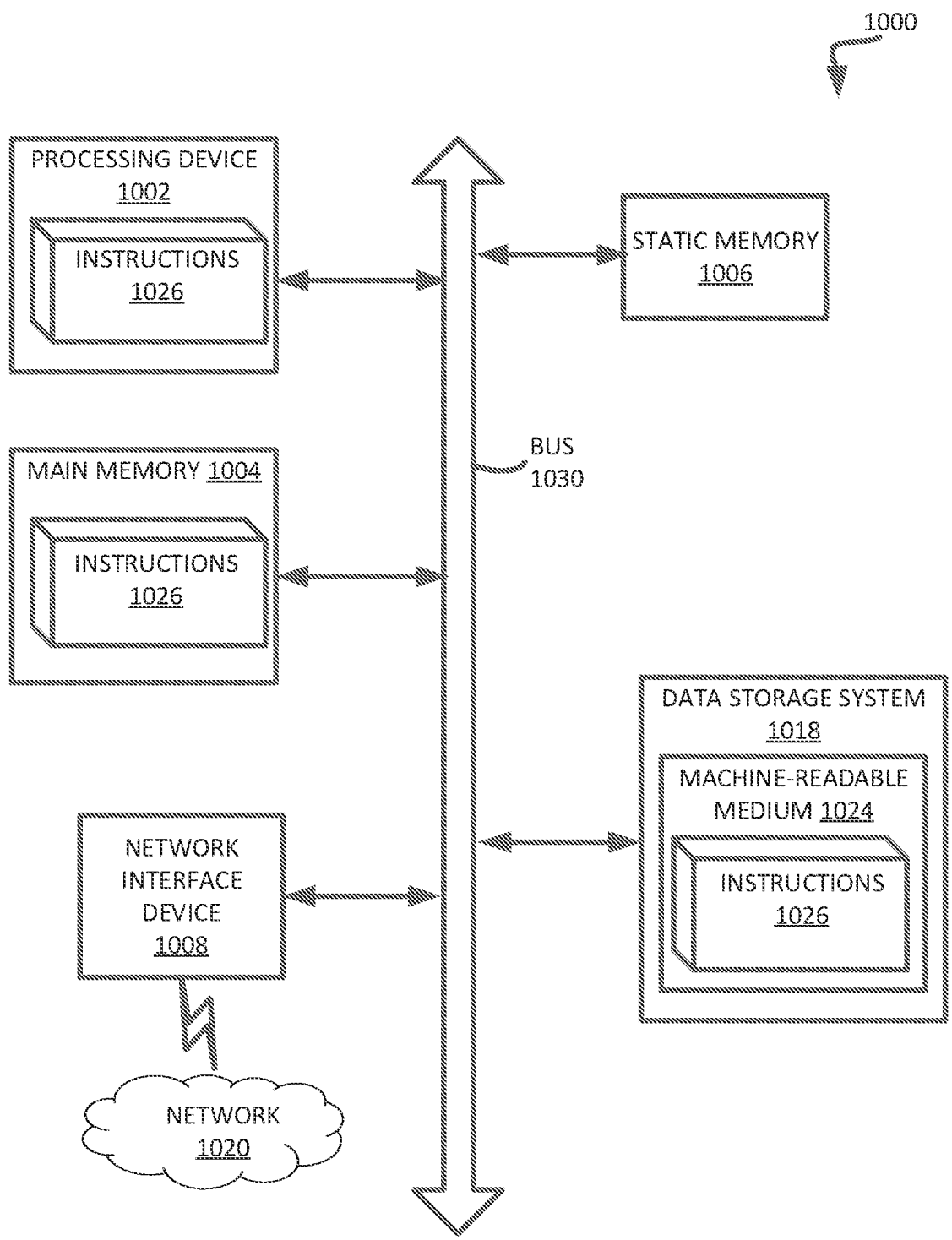
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can implement a node (e.g., the node 112-1 of FIG. 1) or a consensus support platform (e.g., the consensus support platform 140 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or RDRAM, etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media.

In one embodiment, the instructions 1026 include instructions to implement functionality corresponding to implementing a distributed ledger system. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
  a first synchronization group of nodes of a distributed ledger network;
  wherein each node of the first synchronization group of nodes is time synchronized to participate in at least one consensus process of a set of consensus processes using a trust-based consensus model, wherein, to use the trust-based consensus model, each node of the first synchronization group of nodes is associated with a respective trust value indicative of trust in participating in the at least one consensus process, and wherein each respective trust value is updated based on success of participation of the node in the at least one consensus process;
  wherein the first synchronization group of nodes comprises a first node; and
  wherein, to participate in the at least one consensus process, the first node is to participate in at least one of:
    a primary consensus process to generate, by the first synchronization group of nodes after a primary synchronization period defined for the first synchronization group of nodes, a first primary consensus block based at least in part on a content block obtained by the first node;
    a bridge consensus process asynchronously performed to generate a bridge consensus block by synchronizing the first primary consensus block generated by the first synchronization group of nodes with at least a second primary consensus block generated by a second synchronization group of nodes of the distributed ledger network; or
    a global consensus process to generate, after a global synchronization period defined for the distributed ledger network, a global consensus block by synchronizing a plurality of bridge consensus blocks comprising the bridge consensus block.

2. The system of claim 1, further comprising a brokering agent of the distributed ledger network, wherein the first node is further to receive transaction data for placement into the content block from the brokering agent.

3. The system of claim 1, wherein the first primary consensus block further comprises a set of tallied data related to participation of the first synchronization group of nodes in the primary consensus process.

4. The system of claim 3, wherein the set of tallied data further comprises a number of available credits after the primary synchronization period, a number of available stamps after the primary synchronization period, and a credit floor after the primary synchronization period.

5. The system of claim 1, further comprising a consensus support platform operatively coupled to at least the first synchronization group of nodes to support the at least one consensus process.

6. A method comprising:
  receiving, by a first node comprising a processing device, a content block, wherein the first node is comprised by a first synchronization group of nodes of a distributed ledger network; and
  participating, by the first node, in at least one consensus process to generate at least one consensus block based at least in part on the content block;
  wherein each node of the first synchronization group of nodes is time synchronized to participate in the at least one consensus process using a trust-based consensus model, wherein, to use the trust-based consensus model, each node of the first synchronization group of nodes is associated with a respective trust value indicative of trust in participating in the at least one consensus process, wherein each respective trust value is updated based on success of participation of the node in the at least one consensus process, and wherein participating in the at least one consensus process comprises participating in at least one of:
- a primary consensus process to generate, by the first synchronization group of nodes after a primary synchronization period defined for the first synchronization group of nodes, a first primary consensus block based at least in part on the content block;
- a bridge consensus process asynchronously performed to generate a bridge consensus block by synchronizing the first primary consensus block generated by the first synchronization group of nodes with at least a second primary consensus block generated by a second synchronization group of nodes of the distributed ledger network; or
- a global consensus process to generate, after a global synchronization period defined for the distributed ledger network, a global consensus block by synchronizing a plurality of bridge consensus blocks comprising the bridge consensus block.

7. The method of claim 6, further comprising receiving, by the first node, transaction data for placement into the content block from a brokering agent.

8. The method of claim 6, wherein the first primary consensus block further comprises a set of tallied data related to participation of the first synchronization group of nodes in the primary consensus process.

9. The method of claim 8, wherein the distributed ledger network further comprises a consensus support platform operatively coupled to at least the first synchronization group of nodes to support the at least one consensus process.

10. A non-transitory computer-readable storage medium comprising instructions that, when executed by a processing device of a first node, cause the processing device to perform operations comprising:
- receiving a content block, wherein the first node is comprised by a first synchronization group of nodes of a distributed ledger network; and
- participating in at least one consensus process to generate at least one consensus block based at least in part on the content block, wherein each node of the first synchronization group of nodes is time synchronized to participate in the at least one consensus process using a trust-based consensus model, wherein, to use the trust-based consensus model, each node of the first synchronization group of nodes is associated with a respective trust value, indicative of trust in participating in the at least one consensus process, wherein each respective trust value is updated based on success of participation of the node in the at least one consensus process, and wherein participating in the at least one consensus process comprises participating in at least one of:
  - a primary consensus process to generate, by the first synchronization group of nodes after a primary synchronization period defined for the first synchronization group of nodes, a first primary consensus block based at least in part on the content block;
  - a bridge consensus process asynchronously performed to generate a bridge consensus block by synchronizing the first primary consensus block generated by the first synchronization group of nodes with at least a second primary consensus block generated by a second synchronization group of nodes of the distributed ledger network; or
  - a global consensus process to generate, after a global synchronization period defined for the distributed ledger network, a global consensus block by synchronizing a plurality of bridge consensus blocks comprising the bridge consensus block.

11. The non-transitory computer-readable storage medium of claim 10, wherein the distributed ledger network further comprises a consensus support platform operatively coupled to at least the first synchronization group of nodes to support the at least one consensus process.

12. The method of claim 8, wherein the set of tallied data further comprises a number of available credits after the primary synchronization period, a number of available stamps after the primary synchronization period, and a credit floor after the primary synchronization period.

13. The non-transitory computer-readable storage medium of claim 10, wherein the operations further comprise receiving, from a brokering agent, transaction data for placement into the content block.

14. The non-transitory computer-readable storage medium of claim 10, wherein the first primary consensus block further comprises a set of tallied data related to participation of the first synchronization group of nodes in the primary consensus process.

15. The non-transitory computer-readable storage medium of claim 14, wherein the set of tallied data further comprises a number of available credits after the primary synchronization period, a number of available stamps after the primary synchronization period, and a credit floor after the primary synchronization period.

* * * * *